United States Patent [19]

Geirnaert

[11] 4,391,232
[45] Jul. 5, 1983

[54] INTERNAL-COMBUSTION ENGINE WITH OPPOSED PISTONS

[76] Inventor: Marcel J. Geirnaert, Assesteenweg 360, B-1741, Wambeek-Ternat, Belgium

[21] Appl. No.: 247,317

[22] Filed: Mar. 25, 1981

[30] Foreign Application Priority Data

Mar. 27, 1980 [BE] Belgium .................................. 199984

[51] Int. Cl.³ ............................................ F02B 75/28
[52] U.S. Cl. ................................. 123/51 BA; 123/561
[58] Field of Search ............. 123/51 R, 51 B, 51 BA, 123/51 BD, 561, 559, 565; 60/607, 608

[56] References Cited

U.S. PATENT DOCUMENTS

| | | | |
|---|---|---|---|
| 2,227,853 | 1/1941 | Turner | 123/51 BA |
| 3,418,986 | 12/1968 | Scherenberg | 123/559 |
| 3,550,568 | 12/1970 | Peterson | 123/51 BD |
| 4,248,183 | 2/1981 | Noguchi et al. | 123/51 BA |

Primary Examiner—Craig R. Feinberg
Attorney, Agent, or Firm—Young & Thompson

[57] ABSTRACT

Each cylinder is surrounded by four annular channels. The first three annular channels are in communication with the interior volume of the cylinder through a plurality of spaced apart openings and with a transfer channel connecting the opposite ends of the interior volume of the cylinder. The fourth annular channel is in communication with the interior volume of the cylinder through a plurality of spaced apart openings and with the exhaust pipe. The transfer channel has its wall formed with a plurality of spaced apart apertures therethrough, these apertures being distributed lengthwise of the transfer channel, such that they put the transfer channel in communication with the intake pipe, the apertures being provided each with a one-way low-inertial inlet device for allowing a high rate air flow to be aspirated into the cylinder with substantially no flow back towards the intake pipe.

3 Claims, 5 Drawing Figures

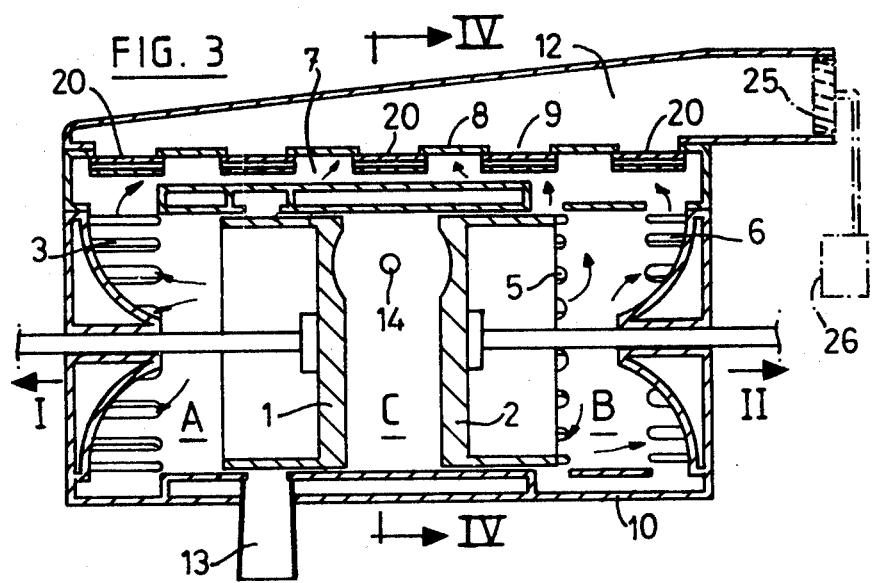
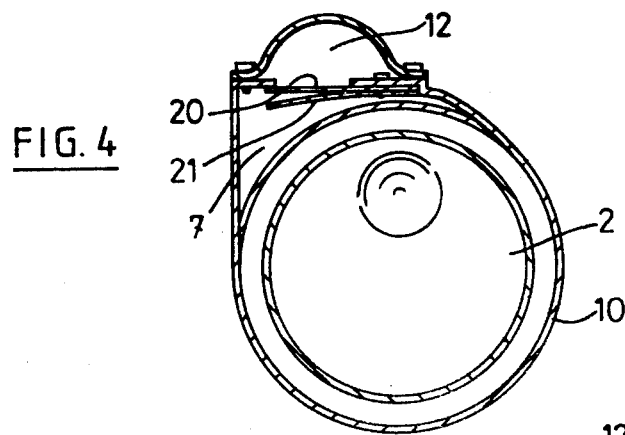
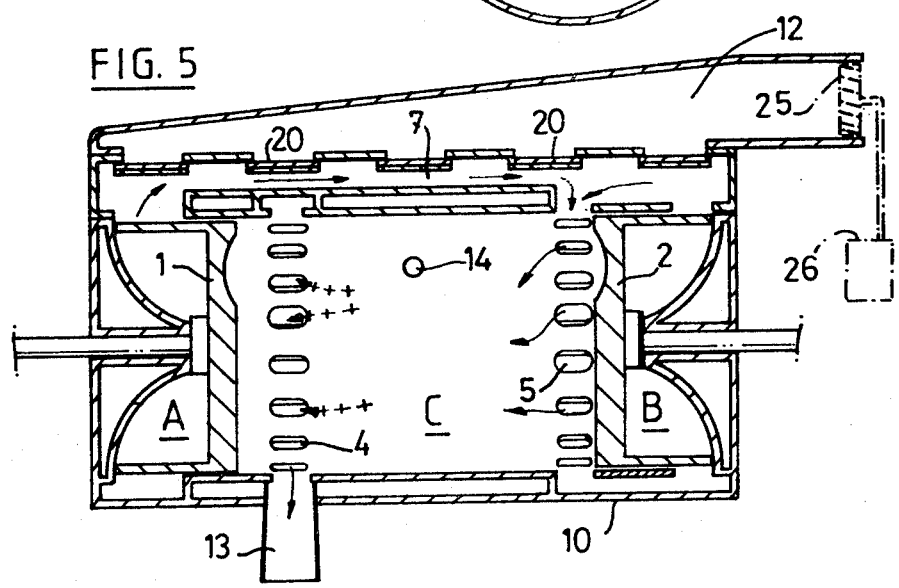

INTERNAL-COMBUSTION ENGINE WITH OPPOSED PISTONS

BACKGROUND OF THE INVENTION

The present invention relates to an internal-combustion engine in which each cylinder includes two opposed pistons and it is particularly concerned with an improvement in the air feed system for an engine of the mentioned type.

The effective power per cylinder and the torque of an internal-combustion engine decrease rapidly when the engine operates at high speed. It is known that this results from a bad cylinder charging with air-fuel mixture, which substantially diminishes the effective average pressure applied to each piston. A standard passenger-car has a cylinder charging ratio which does not exceed about 80% at an engine speed of about 4000 t/m.

In a two-stroke-cycle engine the scavenging and the cylinder charging ratio are worse at high engine speeds than in a standard four-stroke-cycle engine as a consequence of the strokes succeeding faster. This is the reason why a standard two-stroke-cycle engine is generally badly suitable for operation at high speed. However, the two-stroke-cycle engine exhibits advantages which make it an attractive engine to be used in many appliances and recently even in airplanes.

The problem to be solved, however, still remains to improve the volumetric efficiency of the two-stroke-cycle engine, that is to achieve a good scavenging of the combustion chamber such that the cylinder charging ratio is substantially improved.

SUMMARY OF THE INVENTION

It is the object of this invention to solve the above-mentioned problem in an internal-combustion engine in which each cylinder includes two opposed pistons.

In accordance with this invention, there is provided an internal-combustion engine in which each cylinder is surrounded by four annular channels. The first three annular channels are in communication with the interior volume of said cylinder through a plurality of spaced apart openings and with a transfer channel connecting the opposite ends of the interior volume of said cylinder. The fourth annular channel is in communication with the interior volume of said cylinder through a plurality of spaced apart openings and with the exhaust pipe. The transfer channel has its wall formed with a plurality of spaced apart apertures therethrough, said apertures being distributed lengthwise of the transfer channel, such that they put the transfer channel in communication with the intake pipe, said apertures being provided each with a one-way low-inertial inlet device for allowing a high rate air flow to be aspirated into the cylinder with substantially no flow back towards the intake pipe.

DESCRIPTION OF THE DRAWINGS

An exemplary embodiment of the invention is described hereinafter with reference to the accompanying drawings wherein:

FIG. 3 is a view similar to that of FIG. 1, with the pistons shown in a position during the power stroke;

FIG. 4 is a sectional view taken along line IV—IV in FIG. 3;

FIG. 5 is a view similar to that of FIG. 1, with the pistons shown in their position at the end of the power stroke.

DESCRIPTION OF AN EXEMPLARY EMBODIMENT OF THE INVENTION

Figure 1:
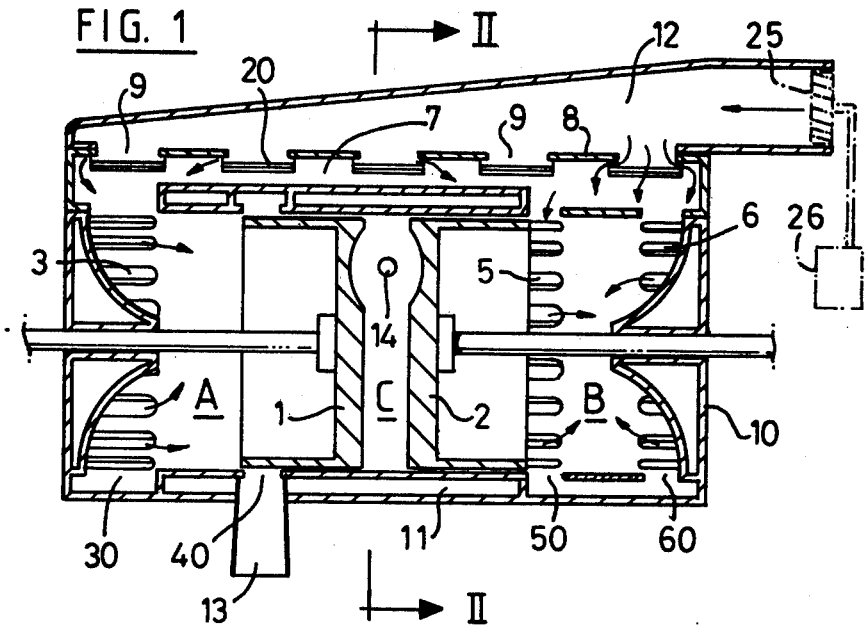
FIG. 1 is a lengthwise sectional view of a cylinder arranged according to this invention with the pistons shown in their positions at the end of the compression stroke.
Figure 2:
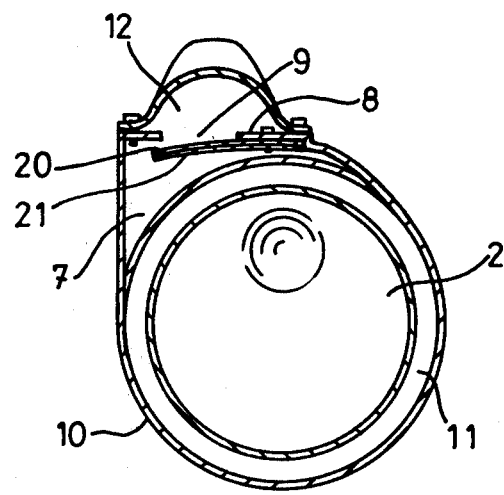
FIG. 2 is a sectional view taken along line II—II in FIG. 1.

The drawings illustratively show one of the cylinders of an injection two-stroke-cycle engine. There is shown a cylinder 10 including a water-jacket 11 in which there are slidably mounted two opposed pistons 1 and 2. The pistons are mounted to operate in opposition and they have each two working faces. The numeral 12 denotes the air intake pipe, numeral 13 denotes the exhaust pipe and numeral 14 denotes a fuel injection nozzle. The wall of the cylinder bore is provided with four annular rows of spaced apart openings 3,4,5 and 6. The openings 3, 5 and 6 provide communication between the interior volume of the cylinder 10 and three annular channels 30, 50, 60. The latter provide communication with the transfer channel 7. The openings 4 provide communication between the interior volume of the cylinder 10 and a fourth annular channel 40 which in turn communicates with the exhaust pipe 13. At a first end, the transfer channel 7 communicates with the interior volume of cylinder 10 through an annular channel 30. At its second end, the transfer channel 7 communicates with the interior volume of cylinder 10 through the annular channels 50 and 60.

The intake pipe 12 is separated from the transfer channel 7 by a partition 8 having a row of spaced apart apertures 9 formed therethrough. The row of apertures 9 extends over the entire length of the transfer channel 7. Each aperture 9 is provided with a one-way low-inertial inlet device, e.g. a flexible blade 20. FIG. 4 shows in detail the mounting arrangement for a blade 20. The blade is mounted such that it is caused to bend toward the interior volume of the transfer channel 7 and to urge against a counterblade 21 when air is aspirated from the intake pipe 12 into the cylinder 10.

Referring to FIG. 1, the pistons 1 and 2 are represented at their top dead center when they have completed their compression stroke.

The chambers A and B are filled with air aspirated from the intake pipe 12 through the apertures 9 in the partition 8. Thanks to the uniform distribution of the openings 9 lengthwise of the transfer channel 7, fresh air has been aspirated at a high rate through the annular channels 30, 50 and 60 into the cylinder 10. The combustion chamber C then contains air which is compressed between the two pistons 1 and 2.

When fuel is injected through nozzle 14, firing occurs in chamber C and the pistons 1 and 2 are pushed away from each other in the directions of arrows I and II respectively.

FIG. 3 shows the two pistons slightly spaced apart from their top dead center. The piston body of piston 1 covers the exhaust openings 4. With the pistons moving away, the air charge which filled the chambers A and B has been expelled through the annular channels 30, 50 and 60 into the transfer channel 7 and thereby applies a pressure to the blades 20. As a consequence, the apertures 9 are kept closed such that any flow back of air towards the intake pipe 12 is prevented.

When the pistons 1 and 2 approach the end of their power stroke (FIG. 5), the exhaust openings 4 and the openings 5 are uncovered. The air charge in chamber A is completely expelled into the transfer channel 7 and forced through the annular channel 50 and the openings 5 into chamber C, thereby efficiently scavenging the combustion chamber C. The spent products of combustion are thereby efficiently pushed into the exhaust pipe 13, which assures an excellent fresh air charging of the chamber C. The described arrangement thus substantially improves the cylinder charging up to a ratio which can exceed the normal cylinder charging ratio of the usual four-stroke-cycle engines even at high speeds. The improvement of this invention thereby allows lightweight and compact engines to be constructed which can provide high power and high efficiency at high speeds.

In FIGS. 1, 3 and 5 is schematically represented a turbine 25 associated with an oil distributor 26 serving to lay an oil film onto the turbine vanes. The air which is aspirated through the intake pipe 12 drives the turbine 25 with the result of vaporizing oil in the air in order to assist in lubricating the interior of the cylinder. The provision of the turbine 25 further improves the cylinder charging by slightly compressing the air trapped in the intake pipe 12 when the blades 20 are closing the apertures 9. This provides an additional amount of compressed fresh air which adds to the fresh air charge forced into the cylinder.

It will be understood that the invention applies equally to a carburettor engine in which the intake pipe admits a fuel-air mixture.

What is claimed is:

1. An internal-combustion engine comprising a housing including at least one cylinder unit comprising a cylinder bore with two opposed pistons each having two working faces slidably mounted therein and with fuel admission means, first, second, third and fourth annular channels extending around and adjacent the wall of the cylinder bore over a portion of the length thereof, each of said annular channels being in communication with the interior volume of the cylinder bore through spaced apart openings, the first and fourth annular channels being located at one end of the cylinder bore and the second and third annular channels being located at the opposite end of the cylinder bore; transfer channel means having a length extending lengthwise of the cylinder bore and extending around and adjacent a portion of the wall of the cylinder bore, said transfer channel means being in direct communication with said first second and third annular channels; air intake pipe means extending lengthwise adjacent and along the length of said transfer channel means, a common partition between the air intake pipe means and the transfer channel means along the length of said transfer channel means, said common partition having a plurality of spaced apart apertures therethrough distributed lengthwise of the transfer channel means, said apertures having one-way low-inertia gate means allowing a high rate of air flow from the air intake pipe means through the transfer channel into the cylinder bore and substantially no air flow back from the cylinder bore through the transfer channel means into the air intake pipe means; and an exhaust pipe connected to said fourth annular channel for discharge of the spent products of combustion.

2. An internal-combustion engine according to claim 1, wherein each of said one-way low-inertia gate means comprises a flexible blade mounted so as to bend toward the interior of the transfer channel means when air is aspirated from the intake pipe means into the cylinder bore and to keep said apertures closed when air is circulating along the transfer channel means from one end of the cylinder bore to the other end thereof.

3. An internal-combustion engine according to claim 1, wherein the air intake pipe means includes turbine means associated with an oil distributor, said turbine means being driven by the air aspirated through the air intake pipe means, said turbine means further operating as an inertial blowing means when no air is aspirated into the system.

* * * * *